United States Patent [19]

Ditzler

[11] 3,991,614

[45] Nov. 16, 1976

[54] SEALED CAPACITOR TRANSDUCER FOR FLUID FLOW MEASUREMENT

[75] Inventor: Lee C. Ditzler, Danville, Calif.

[73] Assignee: Universal Engineered Systems, Inc., Pleasanton, Calif.

[22] Filed: Jan. 19, 1976

[21] Appl. No.: 650,435

[52] U.S. Cl. .............................. 73/215; 73/304 C
[51] Int. Cl.$^2$ ..................... G01F 1/20; G01F 23/26
[58] Field of Search............ 73/215, 216, 301, 304 C

[56] References Cited
UNITED STATES PATENTS

| | | | |
|---|---|---|---|
| 3,153,342 | 10/1964 | Pierce et al. | 73/301 |
| 3,212,077 | 10/1965 | Edwards | 73/304 C UX |
| 3,269,180 | 8/1966 | Schreiber | 73/215 |
| 3,729,994 | 5/1973 | Klug | 73/215 X |

Primary Examiner—Richard C. Queisser
Assistant Examiner—John P. Beauchamp
Attorney, Agent, or Firm—Harris Zimmerman

[57] ABSTRACT

A transducer for measuring gravital fluid flow includes a composite weir member having a downstream Palmer-Bowlus flume section and an upstream uniform channel section. A flexible sealed envelope partially filled with dielectric fluid is disposed in the bottom of the uniform channel, and is in open flow communication with a sealed vertical column secured to the channel wall. A pair of capacitive probe electrodes are disposed within the column and the envelope. Fluid pressure of the liquid flowing in the weir forces the dielectric fluid up into the column, thereby altering the capacitive coupling of the electrodes in a manner which is a direct function of the amount of fluid flow in the weir.

10 Claims, 5 Drawing Figures

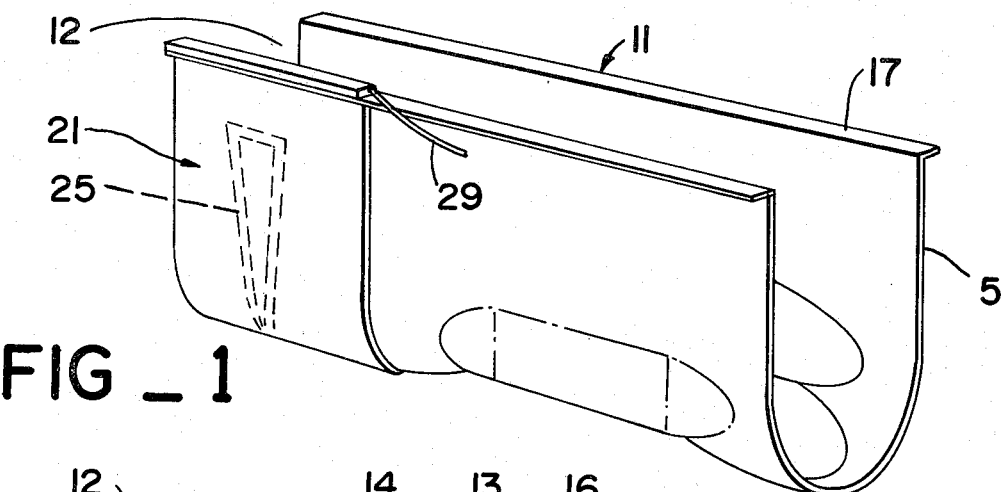
FIG_1
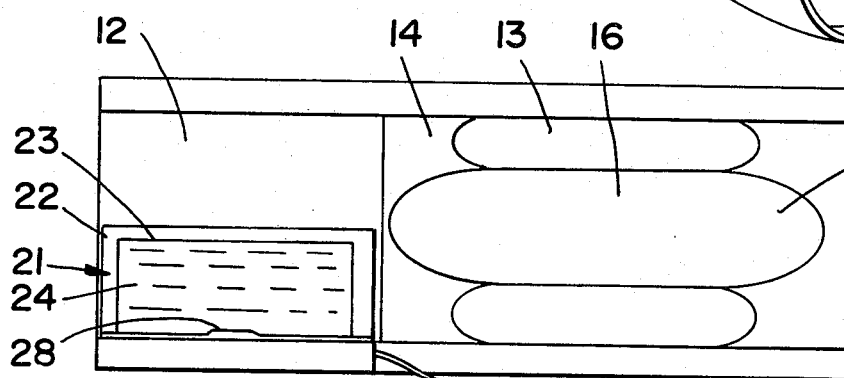
FIG_2
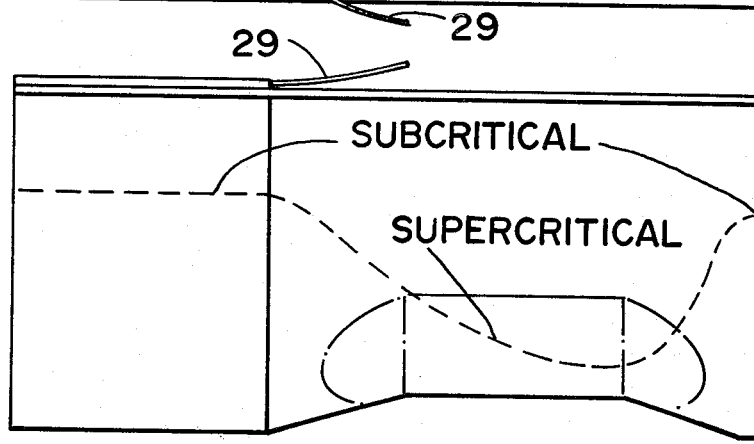
FIG_3
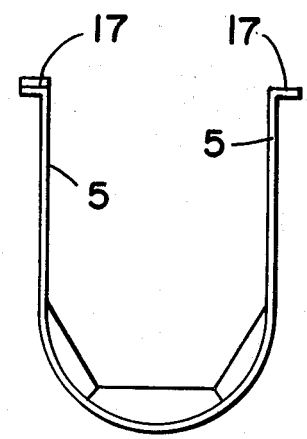
FIG_4
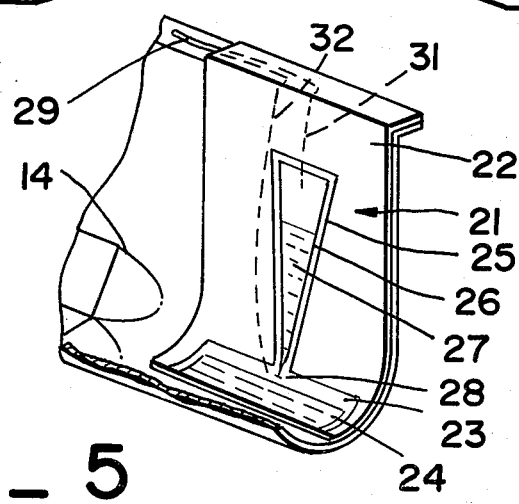
FIG_5

SEALED CAPACITOR TRANSDUCER FOR FLUID FLOW MEASUREMENT

BACKGROUND OF THE INVENTION

The present invention generally relates to the art of measurement of gravital fluid flow, and specifically to said measurement by use of electrical capacitance phenomena in conjunction with a channel-choke critical depth meter.

The art of flow measurement of fluids, effluents, liquefied sewage and the like in functional gravital conduits, such as pipelines and sewer lines, is beset with numerous problems. Conventional mechanical meters using articulating floats, probes and vanes are susceptible to clogging by suspended particulate matter. And, most conventional meters require interim stoppage of the flow for placement of the meter in situ even where a spot measurement and no permanent installation is desired. This is because the interior surfaces of the aforementioned conduits, being invariably irregular with protruding mortar, casting flash, and the like, cause disruptive turbulence. Even conventional meters which employ standard Palmer-Bowlus, Parshall, or broad-crested flumes require interim flow interruption to permit said interior surfaces to be smoothed with a filling compound both upstream and downstream of the flume to avoid said turbulence. Thus, both flow interruption and construction effort are necessary.

It is known in the prior art to measure fluid flow in a flume by means of capacitive effect; i.e., deploying a pair of spaced plates within the flume and measuring the capacitive coupling therebetween which is varied by the height of the fluid in the flume. This method has an inherent limitation in that the variation in measured capacitance is slight, and therefor inaccurate. Further, the flowing fluid is relied upon to vary the capacitive coupling. The fluid may be non-homogeneous, causing variations in the capacitive effect and wide fluctuations in the flow measurement. Also, the fluid may be corrosive or may carry particulate matter; in either case the capacitive probes may be altered by the fluid, causing erroneous readings or requiring constant recalibration.

SUMMARY OF THE INVENTION

The present invention generally comprises a transducer apparatus for measuring fluid flow through a weir by capacitive means which are not subject to errors due to non-homogeneity of the fluid or to corrosion or other physical effects. The transducer apparatus comprises a composite weir having an upstream uniform channel section joined to a downstream Palmer-Bowlus flume section. Disposed in the bottom of the uniform channel section is a sealed, flat, flexible envelope which is partially filled with a dielectric liquid. Joined to the uniform channel wall is a sealed vertical column which is in open flow communication with the envelope.

A capacitive probe electrode is disposed within the vertical column, extending substantially the entire length thereof and into the envelope. A second electrode extends into the envelope adjacent to the lower end of the first electrode. As the level of the fluid in the weir rises, indicative of an increased rate of flow, the increasing pressure on the envelope forces the dielectric fluid out of the envelope and into the vertical column. The height of the dielectric fluid in the column, which is a function of the flow rate in the weir, determines the capacitive coupling between the electrodes. The capacitance may be measured by any well known electronic technique, and be employed in process control or converted to a digital or chart record flow rate readout by standard electronic devices.

THE DRAWING

FIG. 1 is a perspective view of the apparatus of the present invention.

FIG. 2 is a plan view of the weir and transducer of the present invention.

FIG. 3 is a side elevation of the apparatus of the present invention.

FIG. 4 is an end view of the weir of the present invention.

FIG. 5 is an enlarged cutaway view of the transducer of the present invention.

DESCRIPTION OF THE PREFERRED EMBODIMENT

The flow measuring apparatus of the present invention generally includes a composite, high-walled weir member 11 which has an upstream uniform channel section 12 joined to a downstream Palmer-Bowlus flume section 13. The weir has a U-shaped wall member 15 formed of a tough, resilient material such as acrylic polyvinylchloride or the like. The upper extremities of the weir member terminate in longitudinally extending horizontal flanges 17, and reinforcing members (not shown) span the upper extremities to strengthen the weir.

The Palmer-Bowlus flume section is formed by a nozzle section 14, leading to a channel section 16 and a diffuser section 18. The depth of the uniform channel section 12 is equal to the depth of the diffuser section 18 at its discharge point. As is well known in the hydraulic arts, the Palmer-Bowlus flume forces fluid flow to make a transition, as shown in FIG. 3, along the length of the flume from subcritical flow immediately upstream of the nozzle section to supercritical at the channel section, and again to subcritical immediately downstream of the diffuser section. In forcing this transition, the Palmer-Bowlus flume correlates fluid depth immediately upstream of the nozzle section to flow rate of the stream through the flume. This correlation is given by standard calibration curves which are well known in the art.

The fluid depth in the uniform channel section 12 is measured by the transducer 21 of the present invention, as shown in FIGS. 1, 2, and 5. The transducer includes a thin plastic, flexible web 22 which is laminated to the wall member 5 of the channel 12, and which extends from the centerline of the channel up the side and onto the flange 17. Disposed in the lower portion of the web 22 is a generally flat envelope 23 formed of a thin, non form-retaining plastic material. Disposed in the upper portion of the web 22 is a vertically extending triangular aperture 26, in which is secured a similar flexible envelope 25. The envelopes 23 and 25 are in open flow communication and are sealed at their exterior edges.

The lower envelope 23 is partially filled with a dielectric fluid, the remainder of the volume thereof and of the envelope 25 being filled with a gas such as air. A contact electrode 28 extends into the envelope 23 from the upper edge thereof, and a triangular capacitive probe electrode 27 is disposed in the envelope 25 with the lower point thereof extending into the envelope 23 adjacent to the electrode 28. As the depth of the fluid flowing in the channel 12 increases, the fluid pressure therefrom bears on the envelope 23 and forces the dielectric fluid up into the envelope 25. As the dielectric fluid rises the area of the electrode 27 contacted by the dielectric fluid increases, and the capacitive coupling between the two electrodes thus increases. The shape of the electrode 27 is selected so that the capacitance increases linearly as the increase in the rate of fluid flow in the flume.

In the preferred embodiment of the transducer the dielectric fluid in an aqueous solution of copper sulfate, and the electrodes are comprised of a conductive film printed onto a flexible substrate, as is well known in the electrical arts. In a transducer designed for use in an eight inch wide channel, the capacitance varies from 600 picofarads at no flow to 2400 picofarads at full flow. It should be noted that the envelope 23 cannot extend beyond the centerline of the channel, to avoid entrapment of the dielectric fluid in pockets formed by the impinging fluid pressure.

A pair of electrical leads 31 and 32 extend through the web 22 to the electrodes 27 and 28, respectively. These leads are secured to the paired leads of a coaxial cable 29 which extends from the transducer to a capacity measuring electronic device. The capacity measurement can easily be converted to flow rates through the weir.

It should be noted that the transducer of the present invention can be employed effectively in many types of weirs and channels. The shape of the electrode 27 may be selected so that the capacity varies linearly with the flow rate through channels of various configurations. If this is not feasible, the electronic readout device employed in conjunction with the transducer may be provided with a nonlinear coding circuit to accurately convert the measured copacitance to flow rate units.

It may be appreciated that the transducer of the present invention is not subject to the sources of error of prior art devices. The electrodes are isolated from exposure to the fluid flowing in the weir, so that corrosion and precipitation cannot affect the capacitance effect. Furthermore, the capacity effect is due to the uniform dielectric liquid in the envelopes, and is not sensitive to changes in the composition of the fluid flowing in the weir.

I claim:

1. A transducer for measuring the rate of fluid flow through a weir, comprising a flexible envelope means secured to an inner surface of said weir, a dielectric liquid partially filling said envelope means, and a pair of electrodes disposed in said envelope means, at least one of said electrodes being disposed so that increased fluid pressure impinging upon said envelope means causes increased surface area of said at least one electrode to be contacted by said dielectric liquid.

2. The transducer according to claim 1, wherein said envelope means includes a first envelope disposed substantially on the bottom inner surface of said weir.

3. The transducer according to claim 2, further including a second envelope in open flow communication with said first envelope, said second envelope secured to an upwardly extending wall of said weir.

4. The transducer according to claim 3, wherein said at least one electrode is disposed within said second envelope.

5. The transducer according to claim 3, wherein said dielectric liquid partially fills only said first envelope.

6. The transducer according to claim 4, wherein the other electrode is disposed within said first envelope.

7. The transducer according to claim 4, wherein said at least one electrode is configured so that the capacitance between said electrodes increases linearly as the flow rate through said weir.

8. The transducer according to claim 1, wherein said dielectric fluid comprises an aqueous solution of copper sulfate.

9. The transducer according to claim 3, wherein said second envelope is provided with a narrow triangular configuration, the apex thereof joining with said first envelope.

10. The transducer according to claim 7, wherein said at least one electrode comprises a planar conductive member having a narrow triangular configuration, the apex thereof extending downwardly from said second envelope into said first envelope.

* * * * *